US008347505B2

(12) United States Patent
Urban et al.

(10) Patent No.: US 8,347,505 B2
(45) Date of Patent: Jan. 8, 2013

(54) METHOD FOR FABRICATING A CYLINDRICAL SPRING BY COMPRESSIVE FORCE

(75) Inventors: Larry J. Urban, Santa Fe, TX (US); Edward J. O'Malley, Houston, TX (US); Steve Rosenblatt, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1060 days.

(21) Appl. No.: 12/250,272

(22) Filed: Oct. 13, 2008

(65) Prior Publication Data

US 2010/0088895 A1    Apr. 15, 2010

(51) Int. Cl.
*B21D 9/14* (2006.01)
*B21D 15/02* (2006.01)

(52) U.S. Cl. ............ 29/896.93; 29/896.9; 166/137; 175/323; 72/370.19

(58) Field of Classification Search .......... 166/179, 166/191, 136, 137, 138, 120, 381, 387; 29/451, 29/454, 896.9, 896.93; 267/164, 165, 180, 267/182, 162, 1.5; 175/323; 72/59, 370.19, 72/385; 188/371, 377
See application file for complete search history.

(56) References Cited

U.S. PATENT DOCUMENTS

| | | | | | |
|---|---|---|---|---|---|
| 1,554,739 | A | * | 9/1925 | Lewis | 29/423 |
| 1,561,065 | A | * | 11/1925 | Eggleston | 92/42 |
| 1,698,210 | A | * | 1/1929 | Bezzenberger | 72/59 |
| 1,711,075 | A | * | 4/1929 | Zimmerman | 72/84 |
| 1,844,469 | A | * | 2/1932 | Giesler et al. | 72/69 |
| 1,984,002 | A | * | 12/1934 | Ward | 72/55 |
| 2,129,120 | A | * | 9/1938 | Davis | 72/59 |
| 2,183,304 | A | * | 12/1939 | Davis | 72/59 |
| 2,903,242 | A | * | 9/1959 | Bodine, Jr. | 175/55 |
| 2,965,961 | A | * | 12/1960 | Schindler et al. | 29/454 |
| 3,015,354 | A | * | 1/1962 | Wood | 72/59 |
| 3,037,764 | A | | 6/1962 | Paulsen | |
| 3,091,280 | A | * | 5/1963 | Yowell et al. | 72/59 |
| 3,103,244 | A | * | 9/1963 | Schindler et al. | 72/59 |

(Continued)

FOREIGN PATENT DOCUMENTS

WO    8901577    2/1989

OTHER PUBLICATIONS

Coronado, Martin P., et al., "Next-Generation Sand Screen Enables Drill-In Sandface Completions", SPE 113539, Jun. 2002, 1-13.

*Primary Examiner* — David Bryant
*Assistant Examiner* — Jason L Vaughan
(74) *Attorney, Agent, or Firm* — Steve Rosenblatt

(57) ABSTRACT

A spring for use in downhole tools delivers a high force over a long deflection in a relatively uniform fashion. The spring is a tubular shape that is preferably metallic and is preferably plastically deformed into an undulating walled tube either before assembly into a downhole tool or downhole after assembly to the downhole tool. Alternatively the shape can be machined. Spacer rings are used inside and outside the tube as it is compressed to obtain the desired corrugated wall pattern and to prevent localized buckling that can cause wall failure. The spring can conduct pressurized fluids and be rotationally locked to transmit torque and to facilitate milling out. Some machining internally and/or externally can assist in forming the desired corrugated wall shape.

14 Claims, 3 Drawing Sheets

U.S. PATENT DOCUMENTS

| | | | |
|---|---|---|---|
| 3,298,441 A * | 1/1967 | Young | 166/179 |
| 3,315,951 A | 4/1967 | Boschi et al. | |
| 3,394,631 A * | 7/1968 | Thompson | 92/46 |
| 3,409,085 A * | 11/1968 | Oliver | 166/134 |
| 3,409,284 A | 11/1968 | Rix | |
| 3,493,921 A * | 2/1970 | Johns | 367/86 |
| 3,516,493 A * | 6/1970 | McGill | 166/140 |
| 3,530,566 A * | 9/1970 | Abercrombie et al. | 29/447 |
| 3,577,621 A * | 5/1971 | De Gain | 29/897.2 |
| 3,584,858 A | 6/1971 | Beck | |
| 3,677,535 A | 7/1972 | Beck | |
| 3,704,983 A * | 12/1972 | Tellot | 72/59 |
| 3,774,896 A * | 11/1973 | Rode | 267/182 |
| 3,884,457 A * | 5/1975 | Leko | 267/162 |
| 3,908,769 A * | 9/1975 | Schuyf et al. | 175/48 |
| 4,065,947 A * | 1/1978 | Mazier | 72/59 |
| 4,235,427 A | 11/1980 | Bialobrzeski | |
| 4,254,837 A * | 3/1981 | Jones | 175/67 |
| T100801 I4 | 7/1981 | Bianca | |
| 4,364,252 A * | 12/1982 | Koizumi | 72/59 |
| 4,566,678 A | 1/1986 | Anderson | |
| 4,593,765 A * | 6/1986 | Greenlee | 166/387 |
| 4,697,640 A * | 10/1987 | Szarka | 166/120 |
| 4,750,564 A * | 6/1988 | Pettigrew et al. | 166/387 |
| 4,996,857 A * | 3/1991 | Kageyama et al. | 72/18.6 |
| 5,036,945 A * | 8/1991 | Hoyle et al. | 181/104 |
| 5,127,354 A | 7/1992 | Magrab et al. | |
| 5,141,697 A * | 8/1992 | Wydra | 264/320 |
| 5,146,993 A * | 9/1992 | Gambertoglio | 166/387 |
| 5,222,718 A * | 6/1993 | Buck | 267/162 |
| 5,284,208 A * | 2/1994 | Clemens et al. | 166/383 |
| 5,326,083 A | 7/1994 | Wydra et al. | |
| 5,351,844 A | 10/1994 | Carlstedt | |
| 5,868,384 A | 2/1999 | Anderson | |
| 5,927,401 A * | 7/1999 | Morris et al. | 166/64 |
| 6,119,774 A * | 9/2000 | Doane et al. | 166/134 |
| 6,182,755 B1 | 2/2001 | Mansure | |
| 6,250,617 B1 | 6/2001 | Tews | |
| 6,253,856 B1 * | 7/2001 | Ingram et al. | 166/374 |
| 6,282,939 B1 * | 9/2001 | Minamidate et al. | 72/370.19 |
| 6,302,217 B1 * | 10/2001 | Kilgore et al. | 166/382 |
| 6,328,062 B1 | 12/2001 | Williams et al. | |
| 6,357,377 B1 | 3/2002 | Santelli, Jr. | |
| 6,386,012 B2 * | 5/2002 | Minamidate et al. | 72/302 |
| 6,516,878 B1 * | 2/2003 | McGarian et al. | 166/242.7 |
| 6,536,532 B2 | 3/2003 | Doane | 166/387 |
| 6,564,606 B2 * | 5/2003 | Okada et al. | 72/59 |
| 6,684,547 B2 | 2/2004 | Poff, Jr. | |
| 6,715,560 B2 * | 4/2004 | Doane et al. | 166/387 |
| 6,820,317 B2 * | 11/2004 | Okada | 29/421.1 |
| 6,896,049 B2 | 5/2005 | Moyes | |
| 7,080,436 B2 * | 7/2006 | Durand | 29/421.1 |
| 7,090,020 B2 * | 8/2006 | Hill et al. | 166/373 |
| 7,216,737 B2 * | 5/2007 | Sugiyama | 181/108 |
| 7,604,048 B2 | 10/2009 | Kossa et al. | |
| 7,757,764 B2 * | 7/2010 | Vert et al. | 166/285 |
| 7,798,213 B2 | 9/2010 | Harvey et al. | |
| 2001/0039822 A1 * | 11/2001 | Minamidate et al. | 72/370.19 |
| 2001/0052253 A1 * | 12/2001 | Okada et al. | 72/59 |
| 2003/0126732 A1 * | 7/2003 | Okada | 29/454 |
| 2007/0194508 A1 * | 8/2007 | Bucciero | 267/182 |

* cited by examiner

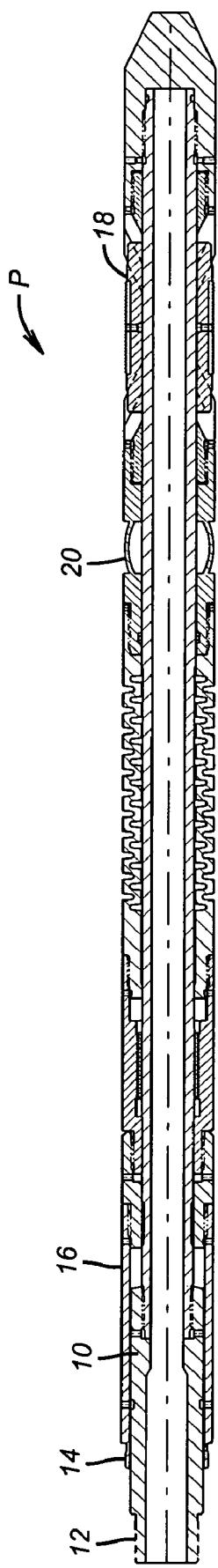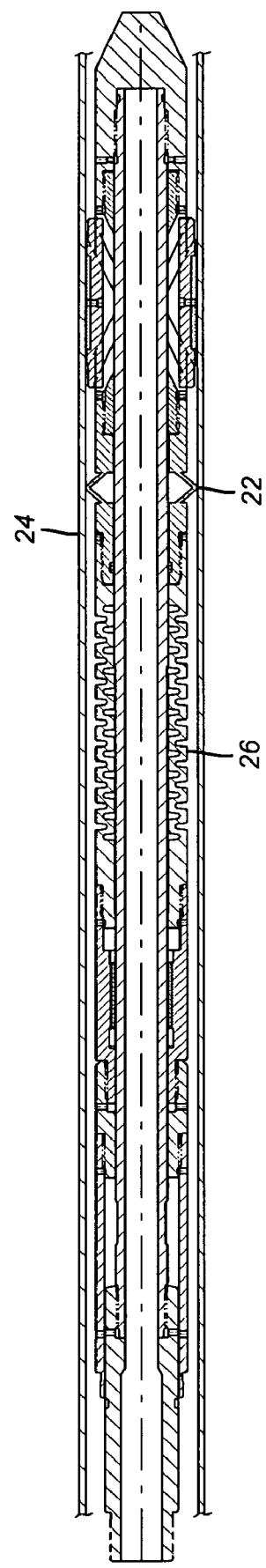
FIG. 1
FIG. 2

US 8,347,505 B2

METHOD FOR FABRICATING A CYLINDRICAL SPRING BY COMPRESSIVE FORCE

FIELD OF THE INVENTION

The field of this invention is springs and more particularly springs for downhole use where high force and a long deflection range is needed where the spring is a tubular structure created by compressive loading before or after assembly into a downhole tool.

BACKGROUND OF THE INVENTION

Tubular shapes with wavy edges made from rubber or other plastics generally by molding the shape and compressing it when in service to serve as a spring are well known as shown in U.S. Pat. No. 5,141,697 (ribs control buckle locations); U.S. Pat. No. 4,235,427 (bellows wall on plastic tube); U.S. Pat. No. 5,326,083 (elastomer tubular shape for automotive use; U.S. Pat. No. 3,037,764 (elastomer tube with external scores used as a spring); U.S. Pat. No. 5,868,384 (steel tube surrounded by rubber cylinder with both compressed to make a spring with an internal stiffener); U.S. Pat. No. 3,409,284 (molded rubber cylindrical shape used a spring); U.S. Pat. No. 3,315,951 (bellows shaped rubber tube with ribs); U.S. Pat. No. 5,351,844 (elastomer cylindrical shape with metal end plates used as a spring and U.S. Pat. No. 6,250,617 (bellows shaped rubber tube with metal rings at the bellows peaks to hold an outside dimension in a surrounding tube). WO 8901577 shows what appears to be a fabricated metal bellows for a low force application with opposed or offset undulations used as a spring for sensitive instruments that require low hysteresis such as with measuring instruments. It does not appear that the unique shape is made by simple compression and the shape may be fabricated and rolled into a tube. The key seems to be the positioning of the bends with respect to the neutral axis.

U.S. Pat. No. 6,896,049 illustrates a metal cylinder compressed to the point of collapse to use as a seal at the outward buckle locations. U.S. Pat. No. 6,182,755 assigned to Sandia is for a pre-made metallic bellows that is run in under tension and is made to fold downhole under a compressive force until the folds engage a surrounding surface for sealing.

Most of the references described above are compressed cylinders used as springs and made from resilient rubber structures that are molded to have an undulating wall or scored or ribbed to control where and the extent of buckling that occurs under compressive force as a way to control the force delivered by the spring. Clearly many of these are bulky structures not at all suitable for being a component of a downhole tool that needs significant spring force to create some motion in the operational sequence of a downhole tool.

Some of these references use a fabricated bellows or a scored cylinder not for spring use but for sealing.

The present invention has a variety of aspects. The structure in one embodiment can be created downhole when a cylinder assembled to a tool is compressed downhole. The present invention has a rotational locking feature in a spring. It allows taking flow through a spring as a pressure conductor where there is a pressure differential between the inside and the outside of the tube-shaped spring, represented schematically by arrows 29 and 31 to indicate a differential pressure in either direction. Alternatively there can be openings 27 in the wall to act as dampeners as flow represented by arrow 33 passes through them during movement of the spring. Compressing a cylinder between a mandrel on the inside and a cover tube on the outside is another feature of the invention. The use of a cylindrical spring in a metal to metal seal in a packer is an application of the present invention.

Some packers used downhole employ metal to metal sealing technology against large differential pressures and in hostile temperature environments. In such applications a large spring force is required over a long displacement to retain the metal to metal seal and to compensate for anticipated temperature differentials that can also affect the set of the metal to metal seal. A large spring force may be also required to compensate for the axial backlash (slop) inherent in locking devices such as body lock rings or ratchets that occurs when removing the setting force.

Accordingly, the present invention seeks to provide such a structure that will function in this service as well as other high demand spring applications in space limited environments such as those that the art described above are not designed to be used. Those skilled in the art will appreciate that tubular springs of the present invention can retain pressure differentials, transmit torque and can be fixedly retained at the ends to facilitate mill out of the tool in which they are mounted. Such tubular springs can be mounted to an assembled tool as cylinders and compressed into operating shape downhole or they can be deformed prior to assembly and compressed into position in a downhole tool assembly. These and other aspects of the present invention will be more readily apparent to those skilled in the art from a review of the description of the preferred embodiment and the associated drawings, recognizing that the full scope of the invention is given by the claims.

SUMMARY OF THE INVENTION

A spring for use in downhole tools delivers a high force over a long deflection in a relatively uniform fashion. The spring is a tubular shape that is preferably metallic and is preferably plastically deformed into an undulating walled tube either before assembly into a downhole tool or downhole after assembly to the downhole tool. Flexible rings, split rings, or "C" rings are used inside and outside the tube as it is compressed to obtain the desired corrugated wall pattern and to prevent localized buckling that can cause wall failure. The spring can conduct pressurized fluids and be rotationally locked to transmit torque and to facilitate milling out. Some machining internally and/or externally can assist in forming the desired corrugated wall shape.

BRIEF DESCRIPTION OF THE DRAWINGS

FIG. 1 is a section view of a metal to metal sealing packer in the run in condition using the various embodiments of the spring of the present invention, schematically illustrated;

FIG. 2 is the view of FIG. 1 in the set position;

DETAILED DESCRIPTION OF THE PREFERRED EMBODIMENT

Figure 3:
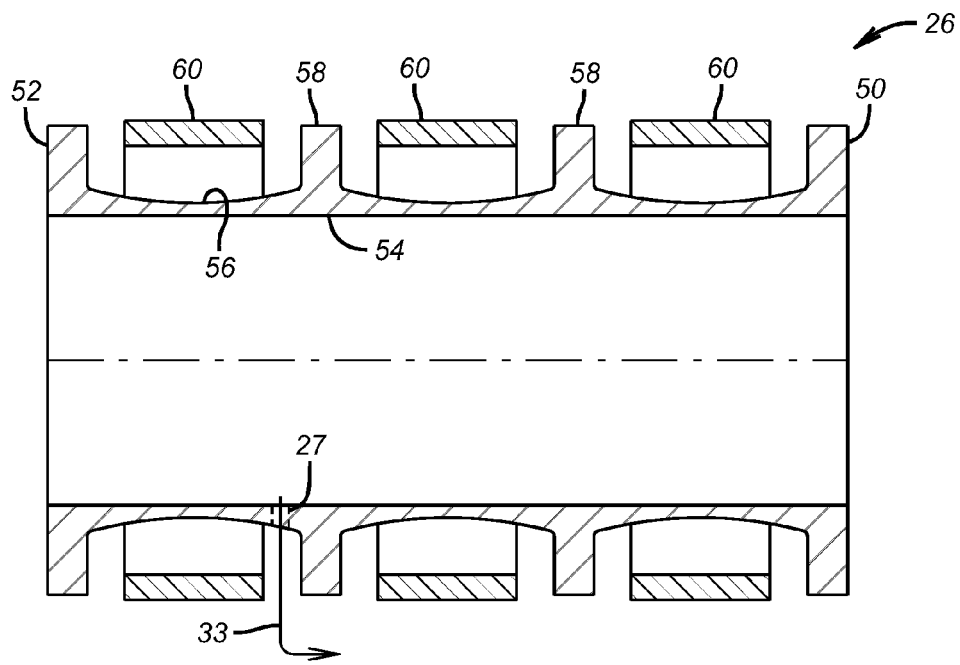
FIG. 3 is a view of one embodiment of the spring of the present invention using integral exterior ribs and shown in a pre-deformed state.

FIG. 1 illustrates an application of the present invention in a packer P. A mandrel 10 has attachment locations 12 and 14 for a setting tool that can shift sleeve 16 while retaining mandrel 10 to set the packer P. When the setting tool (not shown) is actuated the slips 18 are set first as shown in FIG. 2 followed by the collapsing and outward movement of the seal 20 as can also be best seen when comparing FIGS. 1 and 2. The seal 20 has a small dimension to allow clearance for run in and is shaped and scored so that it collapses about its center 22 to form a rounded edge that is driven radially into the surrounding tubular 24. While the structure of seal 20 is a known product now offered by Baker Hughes Incorporated, the device that retains the sealing force is now the tubular spring 26 of the present invention. As seen in these FIGS. it has a tubular shape with an undulating wall. In the preferred embodiment is it a metallic tube that is capable of delivering a force in excess of 80,000 pounds onto the set seal 22 over a deflection distance of about 0.16 inches depending on the diameter and wall thickness and the nature of the wall corrugations.

FIG. 1 shows the spring 26 already having the undulating wall when assembled to the packer P for run in. Optionally, the initial shape can be generally cylindrical with possibly grooves machined internally and/or externally to predispose bending into a bellows shape. The setting tool (not shown) that is used to set the packer P can also be in the input force to transform the initial shape of the spring 26 from generally cylindrical to bellows shaped as shown in FIG. 1. In the course of reshaping the spring 26 downhole, the seal 20 and the slips 18 can be set.

Figure 4:
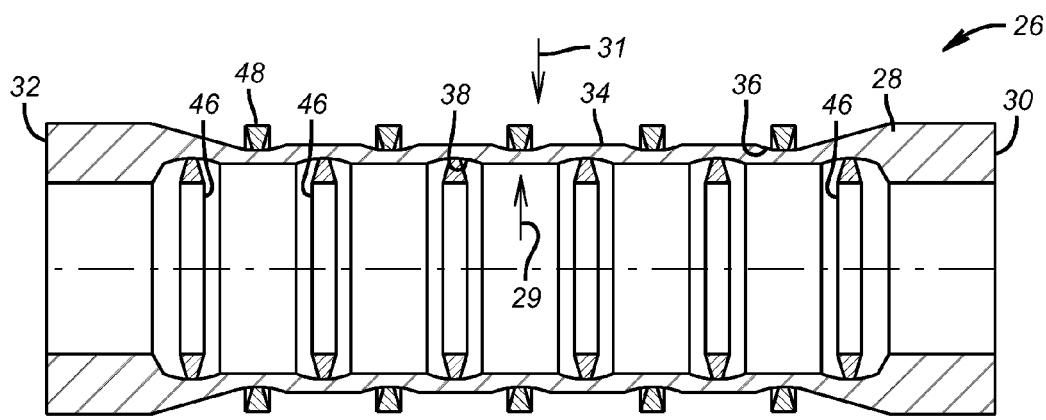
FIG. 4 is a view of another embodiment of the spring of the present invention showing the use of internal and external removable rings for shape control before deformation.
Figure 5:
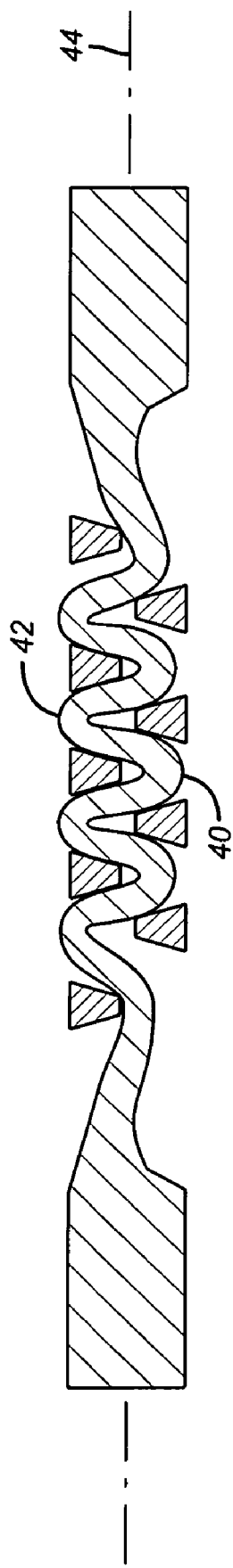
FIG. 5 is the view of FIG. 4 showing how the rings control the bellows shape that results from longitudinal deformation.

FIGS. 4 and 5 illustrate a way the spring 26 can be made at the surface or downhole. A body 28 has end connections 30 and 32. In between is a generally cylindrical wall 34 that preferably has a series of machined recesses 36 on the outer surface and/or recesses 38 on an inside surface. These recesses thin the wall and thus encourage inward bending 40 and outward bending 42 about a neutral axis 44 as shown in FIG. 5. Internal stiffener rings 46 and external rings 48 deployed before the onset of longitudinal deformation help create the resulting bellows shape shown in FIG. 5. These rings lend structural strength to the wall 34 as it collapses from longitudinal compression. The wall 34 preferably plastically deforms to the bellows shape from an initial generally cylindrical shape inside and out. However, after the plastic deformation the bellows or undulating shape retains flexibility to deliver the high forces needed to keep the seal 20 against the surrounding tubular 24 regardless of pressure or thermal gradients when the seal 20 is in the set position. It should be noted that the design just described with the rings 46 and 48 which are preferably split rings so that they can be simply installed can be used with a spring 26 assembled into the packer P before running downhole. In that instance, the setting tool (not shown) for the packer P will accomplish the deformation. The rings 46 and 48 will still be there downhole after deformation or can be removed before running downhole. While the spring 26 can still have some operability with the rings 46 and 48 remaining in position greater functionality can be obtained if the material for the rings is selected to dissolve or otherwise go away upon exposure to well fluids and temperatures. Additionally and optionally, the rings 46 and 48 can be shape memory alloys that go through the transition temperature at expected downhole conditions to push out in the case of rings 46 and to push in in the case of rings 48 to encourage the formation of the desired undulating wall shape for the spring 26.

Figure 6:
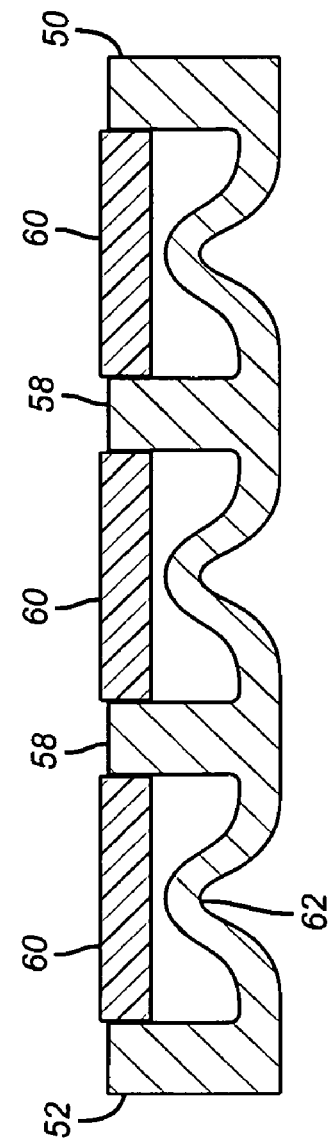
FIG. 6 is the view of FIG. 3 shown after longitudinal deformation.

FIGS. 3 and 6 show another design for the spring 26. There are end connections 50 and 52 that are shown as flanges but can be other designs that permit one or both ends to be fixed against rotation in a tool such as packer P into which the spring is assembled. Rotationally locking any embodiment of the spring is helpful in a mill out situation to keep the spring 26 from spinning when the mill tries to drill it out. In between flange connections 50 and 52 that rotationally lock the spring 26 there is a wall 54 that can have thin portions 56 from external machining. A series of radially extending stiffener ribs 58 extend preferably integrally from the wall 54 to periodically strengthen it so that wall deflection on longitudinal compression will occur in the thin wall portions 56. Spacer rings 60 limit how close the rings 58 can get together on longitudinal deformation forces being applied to wall 54. As shown in FIG. 6, the ribs 58 abut the rings 60 to create preferably equal undulations 62 to give shape to spring 26 in this embodiment. As before, the rings 60 are preferably split to make mounting over flanges 50 or 52 possible and to facilitate removal after longitudinal deformation. The rings 60 can be from a material that dissolves or otherwise goes away under normal well fluid conditions or temperatures in the event the shape of spring 26 is created by the setting tool that sets the tool in which the spring 26 is mounted, such as packer P.

Although packers that seal metal to metal have been discussed as an application, those skilled in the art will appreciate that other downhole tools can benefit from the spring of the present invention and the manner in which it can be produced. Other examples of possible applications can be subsurface safety valves, disconnect couplings and adjustable swages to name a few applications. The materials for the spring 26 while being preferably metallic have to also be compatible with long term exposure to well conditions and the anticipated amount of cycling while in service as well as being able to provide the force needed in the tool in which the spring is deployed. The deformation of the original shape is preferably plastic which still allows flexure in the resulting shape to be able to deliver the required force over the needed deflection range. Alternatively, the desired shape can be obtained by machining a tubular shape with the desired wall characteristics.

It should be noted that prior designs of metal to metal sealing packers tried coiled springs or a stack of Belleville washers. The stack of Belleville washers had significant dampening and friction effects from relative movement among the washers. This tubular spring 26 delivers more force over a comparable or longer deflection range than the previously used coiled springs while being smaller to fit into confined locations for downhole use. Another advantage is the ability of the spring 26 to conduct pressurized fluids for a variety of operational purposes in a downhole tool. By the same token, pressure differentials between the interior and exterior of the spring can be tolerated and the interior can also accommodate internal fluid dampening because of this structure. Alternatively the body of the spring can have openings provided for reasons such as drainage. Alternatively, wall openings can be provided and sized to provide a dampening action when the spring is run in fluid on one or both sides.

The material for the spring can be uniform or dissimilar materials can be used to get desired properties for a given application. Tensile loads can also be applied to the spring 26 such as when applying a pulling force to release seal 20. The spring can be heat treated after plastic deformation to relieve residual stresses. The number of peaks and valleys in the wall can be adjusted to the deflection required in the application for the desired applied operating force.

The above description is illustrative of the preferred embodiment and many modifications may be made by those skilled in the art without departing from the invention whose scope is to be determined from the literal and equivalent scope of the claims below.

We claim:

1. A method of constructing a spring and using the spring in a downhole tool, comprising:
   starting with a substantially cylindrical shaped metallic tube that defines a wall;
   controlling how said wall buckles under compressive loading;
   compressively loading said wall to the point of deformation; and
   using said tube as a spring in a downhole tool after said loading providing with said tube a force of up to 80,000 pounds with deflection up to 0.16 inches to the downhole tool.

2. A method of constructing a spring for a downhole tool, comprising:
   starting with a substantially cylindrical shaped tube that defines a wall;
   controlling how said wall buckles under compressive loading;
   compressively loading said wall to the point of deformation; and
   using said tube as a spring in a downhole tool after said loading;
   reducing the thickness of said wall on at least one location to accomplish said controlling.

3. The method of claim 1, comprising:
   increasing the thickness of said wall on at least one location to accomplish said controlling.

4. The method of claim 3, comprising:
   providing a plurality of spaced external rings on an outer face of said wall.

5. The method of claim 4, comprising:
   providing a temporary travel stop between at least one pair of said rings to limit buckling of said wall between said rings.

6. The method of claim 5, comprising:
   removably mounting said travel stop.

7. The method of claim 6, comprising:
   using an open ring for said travel stop.

8. The method of claim 5, comprising:
   mounting said tube with said travel stop to the tool before said compressively loading;
   compressively loading said tube after mounting said tube on said tool.

9. The method of claim 8, comprising:
   using well fluids or surrounding well conditions to remove said travel stop after it is contacted by said adjacent external rings.

10. The method of claim 2, comprising:
    removably mounting a stiffener at said at least one reduction in said wall thickness.

11. The method of claim 1, comprising:
    rotationally locking said tube in the downhole tool.

12. The method of claim 1, comprising:
    using a metallic material for said tube.

13. The method of claim 1, comprising:
    providing a pressure differential between the inside and the outside of said tube when functioning as a spring in a tool.

14. The method of claim 1, comprising:
    providing at least one opening in the wall of said tube;
    displacing fluid through said opening to dampen the spring force delivered by said tube when assembled to the tool.

* * * * *